(No Model.)
R. H. MARTIN.
COVERING FOR STEAM PIPES, &c.
No. 244,066. Patented July 12, 1881.
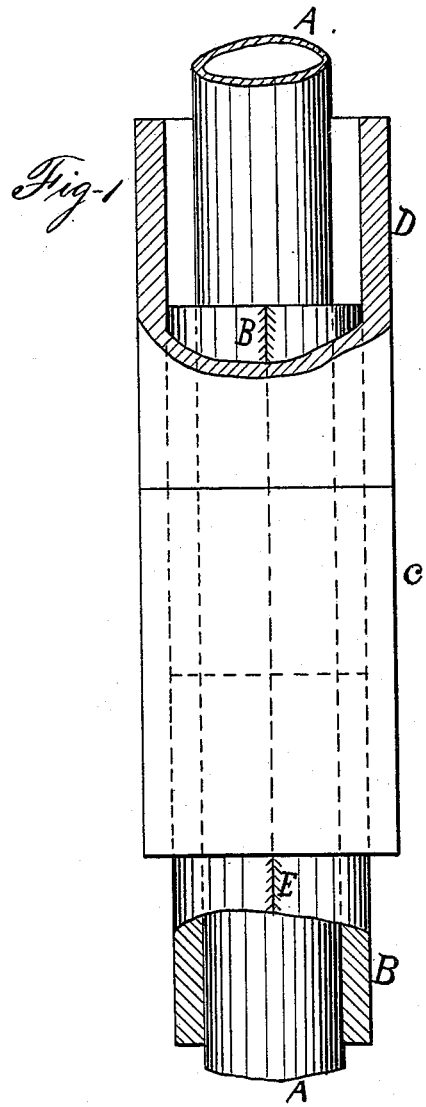
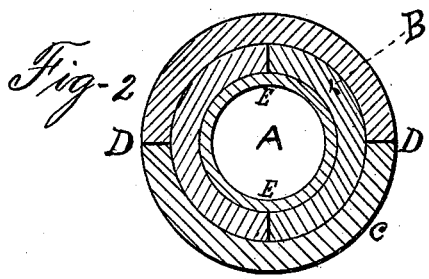
Witnesses
E. B. Barnum
James Demarest
Inventor
Robert H. Martin

UNITED STATES PATENT OFFICE.

ROBERT H. MARTIN, OF BROOKLYN, NEW YORK.

COVERING FOR STEAM-PIPES, &c.

SPECIFICATION forming part of Letters Patent No. 244,066, dated July 12, 1881.

Application filed June 10, 1880. (No model.)

*To all whom it may concern:*

Be it known that I, ROBERT H. MARTIN, of the city of Brooklyn, county of Kings, and State of New York, have invented a new and useful Covering for Steam-Pipes, &c., of which the following is a specification, reference being had to the drawings, wherein—

Figure 1 represents a covered steam-pipe, broken at the top to show a section of an outer layer of covering in section at its joints, and an inner layer with one joint, and broken at the bottom to show the inner layer, as above, broken to show section around the pipe. Fig. 2 represents a cross-section of steam-pipe with the covering, showing the joints in each.

Heretofore in covering steam-pipes and other steam-receptacles with paper or other plastic or elastic coverings the covering has been made in a single thickness, in which the pipe or other steam-receptacle has been enwrapped, and the joint closed by clips or other fastenings or wrappings. In actual use it has been demonstrated that the joints open or curl outward by the action of the heat, leaving spaces through which the heat is radiated and lost.

The object of my invention is to so secure such covering around pipes and other steam-receptacles as to secure the joints so that they will not open and permit such radiation.

The nature of my invention consists in dividing my covering so that two or more layers may be applied, breaking joints in such a way that the joints of the under layers shall be covered and held in position by an outer layer or layers.

In the drawings, A is a steam-pipe. B is a covering fitted around the pipe A, cylindrical in shape in this instance, and divided longitudinally, making a joint at B E E.

C is an outer covering wrapped closely around the covering B, with a joint at D D.

As will be seen, the joints E E are covered by a continuing covering, which, in its turn, is jointed at D D. The result of this arrangement is that by applying a covering of an elastic or plastic nature to steam-pipes, &c., in two or more layers, and breaking the joints, so that the successive layers cover the joints of the preceding layers, each layer is kept in position and radiation is positively prevented.

The joints in each instance may be secured, as heretofore, by packing, or clips, or bands, or similar devices.

These layers will be made in sections of any required width or length, there being no necessity to make them cylindrical or semi-cylindrical, as shown in the drawings.

The sections must be made either large or small with reference to the shape and size of the article to be covered.

What I claim as new is—

A covering for a steam-pipe or other steam or heating receptacle, consisting of a plastic or elastic non-conducting material in sections applied in layers, so that the seams or joints of the inner layer shall be covered or overlapped by the unbroken or continuous surfaces of the succeeding outer layer.

ROBERT H. MARTIN.

Witnesses:
E. B. BARNUM,
JAMES DEMAREST.